(12) United States Patent
Bacher et al.

(10) Patent No.: US 6,681,646 B1
(45) Date of Patent: Jan. 27, 2004

(54) MULTICOMPONENT MEASURING WHEEL

(75) Inventors: Gerarld Bacher, Remshalden (DE); Dieter Dörrie, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/246,042

(22) Filed: Feb. 5, 1999

(30) Foreign Application Priority Data

Feb. 7, 1998 (DE) .......................... 198 04 981

(51) Int. Cl.[7] .................................................. G01L 3/00
(52) U.S. Cl. .................................................. 73/862.08
(58) Field of Search ........................ 73/862.08, 862.04, 73/151, 146, 129, 118.1

(56) References Cited

U.S. PATENT DOCUMENTS

| | | | | |
|---|---|---|---|---|
| 4,098,111 A | * | 7/1978 | Hardmark et al. ............. | 73/129 |
| 4,137,760 A | * | 2/1979 | Raquet .......................... | 73/146 |
| 4,448,083 A | * | 5/1984 | Hayashi .................... | 73/862.04 |
| 4,643,024 A | * | 2/1987 | Kovari et al. .................. | 73/151 |
| 5,313,828 A | * | 5/1994 | Kotzle et al. .................. | 73/146 |
| 5,827,956 A | * | 10/1998 | Beste et al. .................... | 73/146 |

FOREIGN PATENT DOCUMENTS

| | | |
|---|---|---|
| DE | 32 13 319 | 10/1982 |
| DE | 41 33 418 | 11/1993 |
| DE | 42 16 670 | 3/1994 |
| DE | 43 11 903 | 10/1994 |
| DE | 44 30 503 | 2/1996 |
| EP | 0 143 434 | 11/1984 |
| EP | 0 677 729 | 10/1995 |
| EP | 0 816 817 A2 | 4/1997 |
| GB | 2 292 811 | 6/1996 |

\* cited by examiner

Primary Examiner—Max Noori
(74) Attorney, Agent, or Firm—Kenyon & Kenyon

(57) ABSTRACT

A multicomponent measuring capable of measuring strains wheel having a hub, a rim, and a measuring element arranged between the hub and the rim and having strain gauges. The measuring element is a one-piece element and has an axis of rotation substantially parallel to the axis of rotation of the multicomponent measuring wheel.

14 Claims, 1 Drawing Sheet

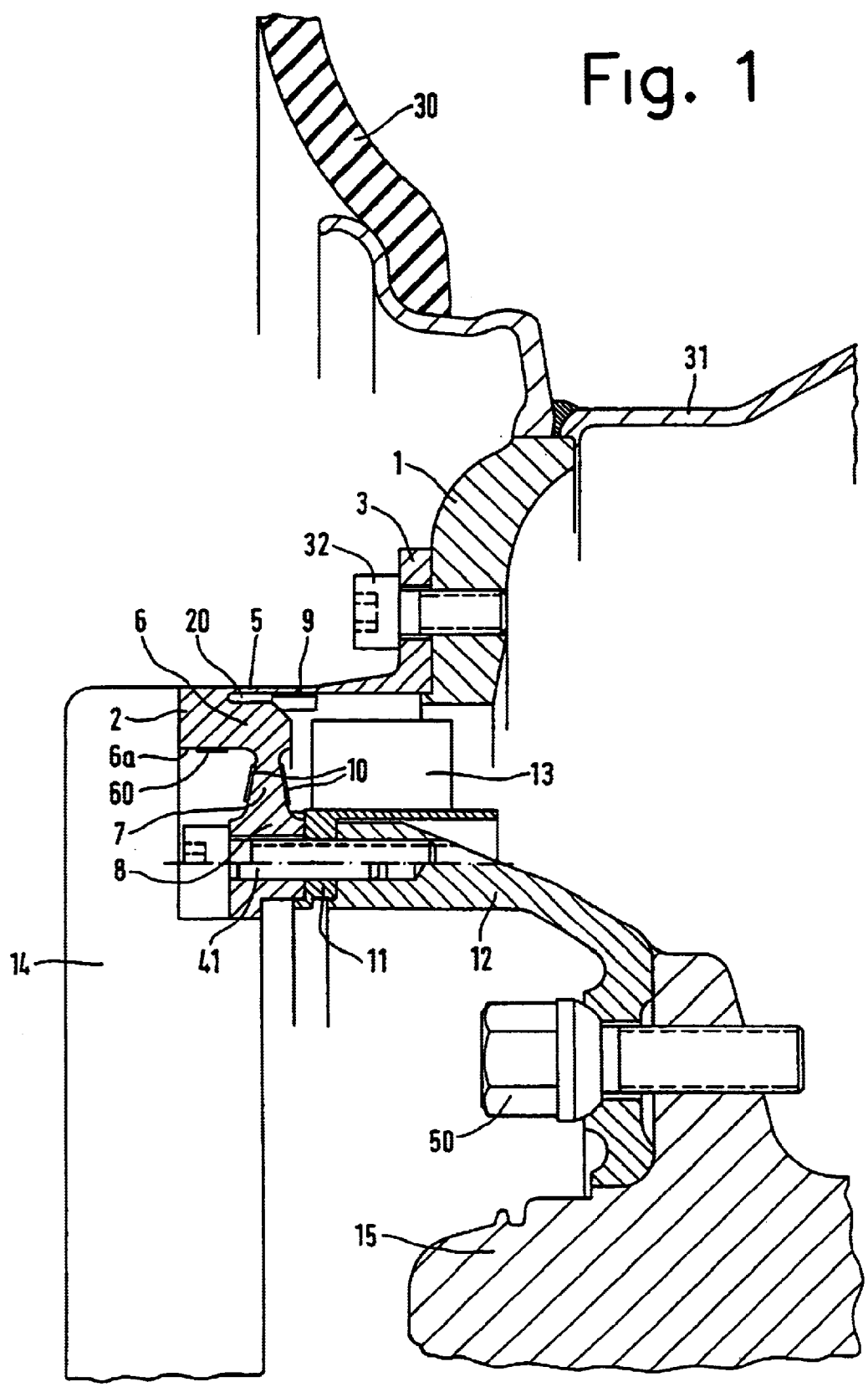

MULTICOMPONENT MEASURING WHEEL

FIELD OF THE INVENTION

The present invention relates to a multicomponent measuring wheel.

BACKGROUND OF THE INVENTION

A multicomponent measuring wheel is described in German Patent No. 41 33 418 C2. The multicomponent measuring wheel described is integrated in a vehicle wheel for measuring purposes and offers the advantage of being able to be installed on different vehicles without requiring significant retrofitting. The actual sensor part, which is coupled to a wheel rim that supports the vehicle tire, is made of a ring of a plurality of stud bolts running in parallel to the wheel axle, and of an essentially star-shaped measuring disk, which includes eight radially running segments joining an inner ring and an outer ring of the measuring disk. Besides securing the measuring disk to an auxiliary flange attached to the wheel rim, the stud bolts act as axial measuring cross-sections and are fitted with strain gauges. The radially configured, spoke-like segments are used as measuring segments, and are likewise fitted with strain gauges. This arrangement facilitates the measuring of force components in the x-, y- and z-direction, as well as of their corresponding moments. The drawback of this multicomponent measuring wheel is that it is made of many individual parts, so that its assembly must be as tolerance-free as possible, and is therefore time-consuming and expensive.

German Patent No. 44 30 503 C1, describes a torque sensor having a strain gauge configuration, whose measuring body is formed from an annular region of a disk member situated in an axial plane. The disk member includes a first torque transmitting part radially adjoining the measuring body region to the inside, and a second torque transmitting part radially adjoining the measuring body region to the outside; one of these constituting the torque-introducing and the other the torque-delivering side for the measuring body region. The annular region has a smaller axial thickness than the torque transmitting parts, so that it exhibits mechanical stresses in response to the action of torque. This torque sensor is suited for determining torques in motor-vehicle gear units.

A multicomponent measuring wheel that has sensors located between the wheel-rim face and a wheel flange is described in German Patent Application No. 43 11 903 A1, the wheel flange and/or the rim face being made from a fibrous composite material. Wheel-side energy- and data-transmission means are mounted on the inner side of the rim well, which accommodates a vehicle tire, and extend essentially over its circumference. The connection between the rim well and the rim face is achieved by fabricating the fibrous composite material for the rim face in the previously sandblasted rim well, thus producing a positive-locking connection characterized by good adhesive power. In the case of the known measuring wheel, this refinement eliminates the need for an energy/data transmission system that projects over the outside lateral contours of the vehicle and for a retaining frame that would otherwise be required for it. However, this refinement entails a rim-specific adaptation, so that the known measuring wheel is not suited for use with other rims.

German Patent No. 42 16 670 C2 describes another multicomponent measuring wheel whose radial/tangential connection arrangement rigidly joins the wheel hub in the radial and tangential directions of the measuring wheel to the rim and, in the axial direction, acts as a soft connection -between the hub and the rim, the stiffness of this connection arrangement differing in the radial and tangential directions. This type of construction would be susceptible to faults due to its relatively non-compact construction.

These prior measuring wheels have the disadvantage of entailing high costs in the manufacturing and installation of the measuring wheels, because of the multiplicity of individual parts. In addition, a large number of strain gauges is needed, so the result is considerable expenditure for applications and wiring. Moreover, an unfavorable ratio can be established between the maximum material stresses and the useful stresses for the strain gauges.

SUMMARY OF THE INVENTION

An object of the present invention is to provide a multicomponent measuring wheel having a measuring element located between a hub and a wheel rim, the measuring element having a small type of construction in the axial direction, i.e., protruding to a relatively small extent out of the wheel plane formed by the hub and the rim.

The present invention therefore provides a multicomponent measuring wheel having a rim (1, 31), a hub (15), and a measuring element (2) arranged between the rim (1, 31) and the hub (15), and having a strain gauge arrangement (9, 10), wherein the measuring element (2) is substantially rotationally symmetric with respect to the axis of rotation of the multicomponent measuring wheel and is designed as a one-piece element.

In accordance with the present invention, a multicomponent measuring wheel having a compact type of construction is provided for measuring forces and torques acting between a hub and a rim. The multicomponent measuring wheel has a very small type of construction, i.e., it protrudes only slightly from the wheel plane formed by the hub and the rim. A multicomponent measuring wheel of this kind is suited for use on a test stand, as well as under conditions of everyday life, such as in street traffic. Since the measuring element is designed as a one-piece element and is rotationally symmetric, it can be easily installed between the hub and the rim. The expenditure for assembly is reduced as compared to conventional measuring arrangements having a plurality of individual parts. The measuring element of the present invention, as well as the rim and hub, are modular components, which can be simply replaced, when needed, on an individual basis.

According to one preferred specific embodiment of the invention, the measuring element has an annular flange, which is attached to the rim and extends essentially radially to the inside; a tubular section adjoining this flange radially to the inside and extending essentially axially; an intermediate flange adjoining the tubular section radially to the inside; an annular region adjoining the intermediate flange radially to the inside; and an annular flange adjoining the annular region radially to the inside and attached to the hub, if indicated via at least one hub adapter. A measuring element of this kind is simple to manufacture in one piece and proves to be very rugged in practice. At the same time, a low level of material stress is ensured, while a high measuring sensitivity is maintained. In this case, the essentially axially extending tubular section, and the essentially radially extending, annular region 7 are used as measuring cross-sections, which are fitted in a generally known manner with the strain gauges, which will be discussed in greater detail further below. Therefore, by uniformly distributing strain gauges of this kind, one can eliminate load-dependent changes in resistance, so that exclusively those changes in resistance that are conditional upon torque are outwardly effective. By suitably configuring the strain gauges, the corresponding useful signals are optimized, while spurious signals are simultaneously minimized. Regarding the various possibilities for wiring strain gauges in this manner, reference is made, for example, to German Patent No. 27 08 484 C2. In contrast to the remaining regions of the measuring element, the sections conceived as measuring cross-sections exhibit relatively little stiffness, so that strains that occur can be effectively used to divert measuring signals.

Expediently formed in the interconnecting region between the tubular section and the intermediate flange is an axial undercut groove, i.e., an axial notch. In this way, the overall axial length of the multicomponent measuring wheel can be further reduced.

According to one preferred embodiment of the multicomponent measuring wheel of the present invention, the axial thickness of the annular region of the measuring element diminishes in the radial direction from the inside to the outside. Therefore, in response to the action of forces or moments, a uniform stress distribution in the radial direction in the annular region is obtained, thus simplifying the evaluation of measuring signals from strain gauges installed there.

The intermediate flange expediently has a radially inwardly directed annular shoulder, or step, region. A shoulder region of this kind is relatively protected from external influences, so that solder tags are able to be advantageously applied in this region.

The strain gauges are advantageously arranged on the annular region, in particular on its axial inner and outer partitions, and/or the tubular section, in particular its inner side. The stiffness of these regions is relatively slight, so that exact measurements are able to be performed.

The strain gauges each advantageously cover an angular range of 20° to 40°. When strain gauges of this kind are used, measuring signals of sufficient amplitude are easily obtained. In addition, fewer strain gauges are needed to attain a sufficiently accurate measurement, as compared to conventional arrangements, so that the outlay for wiring is reduced.

In expedient fashion, the strain gauges of the strain gauge arrangement are wired into full or half bridge circuits. This generally known wiring enables any strain experienced by the multicomponent measuring wheel to be converted into electrical voltage.

According to one advantageous embodiment, the tubular section has an inner conically formed, and an outer cylindrically formed section. This ensures a rugged connection to the radially outer flange, as well as relatively little stiffness for the region of the tubular section, upon which the strain gauges are mounted.

The tubular section advantageously has a diameter/length ratio of less than 1:6. By conforming to these dimensions, a small axial overall height is achieved, while adequate sensitivity is maintained for the measuring element.

Provision is expediently made inside the multicomponent measuring wheel, in particular inside the tubular section, for transmitting components for transmitting recorded measuring signals to an evaluation device. By utilizing the interior space of the tubular section, one can achieve a very compact type of construction for the multicomponent measuring wheel.

It is preferred that the measuring element be attachable by using centering shoulders, or steps, and/or positioning pins, in particular by using at least one hub adapter that is able to be connected to the hub, as well as to the wheel rim. Because connections of this kind are simple to manipulate, the expenditure for assembling the multicomponent measuring wheel is reduced and replacement of the individual parts is facilitated.

BRIEF DESCRIPTION OF THE DRAWINGS

A preferred specific embodiment of the invention will be elucidated in the following on the basis of the attached drawing, in which:

FIG. 1 shows a cross-sectional schematic view of a multicomponent measuring wheel according to the present invention.

DETAILED DESCRIPTION

In FIG. 1, a multicomponent measuring wheel according to the present invention is shown in detail. FIG. 1 illustrates a wheel rim 31, which corresponds in its cross-section to a conventional vehicle wheel. However, instead of a customary wheel disk, the multicomponent measuring wheel has a measuring element 2. Radially to the outside of the wheel axle, the measuring element has an annular flange 3. Via a number of screws 32 extending through bores in annular flange 3, measuring element 2 is connected to wheel rim 31 or to a rim extension 1. A tubular section 5 extends in the axial direction from annular flange 3. Axially to the inside, i.e., contiguous to annular flange 3, this section has a conical profile, and contiguous thereto, a cylindrical profile. At the end of tubular section 5, an intermediate flange 6 is formed radially to the inside. Provided in this case in the interconnection region between tubular region 5 and intermediate flange 6 is a notch 20, which enlarges the effective axial length of tubular section 5. These measures result in the stiffness of tubular section 5 being quite negligible. Radially, inwardly contiguous to intermediate flange 6 is an annular region 7, which leads into another annular flange 8. Similarly to annular section 5, region 7 likewise exhibits relatively little stiffness, so that it fulfills a membrane-like function in the recording of measured values. Via screws 41, which extend through bores of annular flange 8, measuring element 2 is joined to hub adaptors 11, 12. Hub adaptor 12, for its part, is able to be screw-coupled by screws 50 to hub 15. Inserting adaptors 11, 12 between measuring element 2 and wheel hub 15 makes it possible to use the multicomponent measuring wheel, together with a multiplicity of wheel hubs.

In cross-section, annular region 7 has a trapezoidal shape, i.e., the axial thickness of annular region 7 decreases in the radial direction from the inside to the outside. This ensures that stresses occurring in response to forces or torques acting on the measuring wheel are uniformly distributed over annular region 7. The occurring stresses are measured using strain gauges 10, which are uniformly configured over the periphery of the measuring element on the trapezoidally running side walls of annular region 7. Very precise measuring results can be achieved by using strain gauges that extend in the circumferential direction over an angular range of about 20° to 40°. To measure the particular force or moment components, the strain gauges are capable of being wired in generally known fashion into full or half bridges. For this, at least four, preferably eight, strain gauges are provided at uniformly spaced intervals on each side wall of annular region 7.

Other strain gauges 9 are configured on the inner side of tubular region 5. These strain gauges preferably extend over an angular range of 20° to 40°. Provision is made in this case for at least six, preferably 16, strain gauges spaced at uniform intervals over the periphery of the measuring element, these strain gauges likewise being capable of being wired to form full or half bridges.

Measuring signals recorded using the particular intended strain gauges are preprocessed in measuring signal-conditioning and transformer units 13, 14, to be transmitted to the corresponding evaluation units. In the case of power and signal transmission to the hub carrier, the transmission is preferably performed using the transformer in unit 13 and, in the case of transmission to the automobile body, by using the transformer in unit 14. Unit 14 can be designed to substantially cover measuring element to the outside, thereby protecting it from external influences.

Intermediate flange 6 is formed with a radially inwardly directed shoulder 6a, advantageously suited, for example, for applying solder tags 60.

The measuring device according to the present invention is characterized by a low level of material stress, and at the same time by a high sensitivity of the measuring signals.

By integrating the measuring signal-conditioning and transformer units 13, 14 in the measuring element geometry, a small overall axial height is able to be attained for the multicomponent measuring wheel.

It is simple to attach measuring element 2 to the hub adapter, or to the hub and the rim, using centering offsets, or steps, positioning pins and screws (not shown in detail). Defective individual parts may be easily replaced.

What is claimed is:

1. A measuring wheel for measuring strains having an axis of rotation comprising:
   a rim;
   a hub;
   a one-piece measuring element disposed between the rim and the hub, the measuring element being substantially rotationally symmetric with respect to the axis of rotation of the measuring wheel; and
   a strain gauge arrangement disposed on the measuring element capable of determining at least an axial strain and a radial strain of the measuring element; wherein the measuring element includes:
      a first annular flange attached to the rim and extending substantially radially;
      a tubular section adjoining the first annular flange at a radially inward section of the first annular flange, the tubular section extending substantially axially;
      an intermediate flange adjoining the tubular section at a radially inward part of the tubular section;
      an annular region adjoining the intermediate flange at a radially inward portion of the intermediate flange; and
      a second annular flange adjoining the annular region at a radially inward area and connected to the hub.

2. The measuring wheel as recited in claim 1 wherein the second annular flange is connected to the hub using at least one hub adapter.

3. The measuring wheel as recited in claim 1 wherein the measuring element further includes an interconnection region between the tubular section and the intermediate flange, an axial notch provided in the interconnection region.

4. The measuring wheel as recited in claim 1 wherein an axial thickness of the annular region decreases in a radially outward direction.

5. The measuring wheel as recited in claim 1 wherein the intermediate flange includes a shoulder region directed in a radially inward direction.

6. The measuring wheel as recited in claim 1 wherein the strain gauge arrangement includes at least one strain gauge arranged on at least one of the annular region and the tubular section.

7. The measuring wheel as recited in claim 6 wherein the strain gauge arrangement includes at least two strain gauges arranged on axially inner and axially outer portions of the annular region.

8. The measuring wheel as recited in claim 6 wherein the at least one strain gauge is arranged on a radially inward side of the tubular section when the at least one strain gauge is arranged on the tubular section.

9. The measuring wheel as recited in claim 1 wherein the tubular section includes an inner conically formed section and an outer cylindrically formed section.

10. The measuring wheel as recited in claim 1 wherein the tubular section includes a diameter to length ratio of less than 1:6.

11. The measuring wheel as recited in claim 1 further comprising a transmitting device disposed at the measuring element for transmitting recorded measuring signals to an evaluation device.

12. The measuring wheel as recited in claim 11 wherein the transmitting device is disposed inside the tubular section of the measuring element.

13. The measuring wheel as recited in claim 1 wherein the measuring element is capable of being connected to the hub using at least one of centering shoulders, positioning pins and screws, and to the rim.

14. The measuring wheel as recited in claim 13 wherein the measuring element is capable of being connected to the hub using at least one hub adapter. A strain gauge arrangement is disposed on the measuring element and is capable of determining at least an axial strain and a radial strain of the measuring element.

* * * * *

UNITED STATES PATENT AND TRADEMARK OFFICE
CERTIFICATE OF CORRECTION

PATENT NO. : 6,681,646 B1
DATED : January 27, 2004
INVENTOR(S) : Bacher et al.

It is certified that error appears in the above-identified patent and that said Letters Patent is hereby corrected as shown below:

Title page,
Item [57], ABSTRACT,
Line 1, before "capable" insert -- wheel --;
Line 2, delete "wheel";
Line 6, after "wheel." insert the following text: -- A strain gauge arrangement is disposed on the measuring element and is capable of determining at least an axial strain and a radial strain of the measuring element. --; and Column 6,
Line 3, after "adapter." delete "A strain gauge arrangement is disposed on the measuring element and is capable of determining at least an axial strain and a radial strain of the measuring element.".

Signed and Sealed this

Fifteenth Day of February, 2005

JON W. DUDAS
*Director of the United States Patent and Trademark Office*